United States Patent

Imaizumi

Patent Number: 5,301,434
Date of Patent: Apr. 12, 1994

[54] ROTATION ANGLE MEASURING APPARATUS

[75] Inventor: Yoshinobu Imaizumi, Yokohama, Japan

[73] Assignee: Nikon Corporation, Tokyo, Japan

[21] Appl. No.: 992,438

[22] Filed: Dec. 17, 1992

[30] Foreign Application Priority Data

Dec. 24, 1991 [JP]  Japan ................. 3-111938[U]

[51] Int. Cl.$^5$ ............... G01B 11/26; G01D 5/245
[52] U.S. Cl. ........................... 33/1 N; 33/1 PT
[58] Field of Search ............... 33/1 N, 1 PT, 1 AP, 33/534

[56] References Cited

U.S. PATENT DOCUMENTS

| | | | |
|---|---|---|---|
| 4,449,191 | 5/1984 | Mehnert | 33/1 PT |
| 5,032,999 | 7/1991 | Finger et al. | 33/1 PT |
| 5,237,390 | 8/1993 | Chaney | 33/1 N |

FOREIGN PATENT DOCUMENTS

| | | | |
|---|---|---|---|
| 55-67608 | 5/1980 | Japan . | |
| 0067709 | 6/1981 | Japan | 33/1 N |
| 0008712 | 1/1985 | Japan | 33/1 N |

Primary Examiner—William A. Cuchlinski, Jr.
Assistant Examiner—C. W. Fulton
Attorney, Agent, or Firm—Shapiro and Shapiro

[57] ABSTRACT

A third reference pattern which can be detected by a first reference pattern formed on a first detecting member and cannot be detected by a second reference pattern formed on a second detecting member is formed at a first position on a rotatable disk, a fourth reference pattern which can be detected by a second reference pattern formed on the second detecting member and cannot be detected by the first reference pattern formed on the first detecting member is formed at a second position substantially rotation-symmetrical with the first position on the rotatable disk, a signal obtained by the third reference pattern of the rotatable disk being detected by the first reference pattern formed on the first detecting member is supplied as a first reference signal to one signal processing circuit, and a signal obtained by the fourth reference pattern of the rotatable disk being detected by the second reference pattern formed on the second detecting member is supplied as a second reference signal to the other signal processing circuit.

9 Claims, 3 Drawing Sheets

2AB(3AB)

2BB(3BB)

(a) OUTPUT OF 5AB (b) OUTPUT OF 5AA (c) SIGNAL P1

(d) SIGNAL ωA (e) OUTPUT OF 8A (f) RESET SIGNAL R1

ROTATION ANGLE MEASURING APPARATUS

BACKGROUND OF THE INVENTION

1. Field of the Invention

This invention relates to a rotation angle measuring apparatus using a rotatable disk formed with a pattern for rotation angle detection.

2. Related Background Art

In a rotation angle measuring apparatus disclosed in Japanese Laid-Open Patent Application No. 55-67608, an index disk is provided concentrically with a rotatable disk having a radial grating of equiangular pitch on the circumference thereof so as to be opposed to the rotatable disk, and at rotation-symmetrical positions on the index disk, two index gratings of the same pitch as the radial grating of the rotatable disk are provided at opposite phases, and two light sources and two photoelectric conversion elements are provided with the two index gratings and the rotatable disk interposed therebetween. Two signal processing circuits are provided correspondingly to the two photoelectric conversion elements, respectively.

The output signals of the two photoelectric conversion elements are converted into pulses in the respective corresponding signal processing circuits, and the pulses are counted by counters. The count values of the two counters are averaged by an averaging circuit, and a display circuit converts the output value of the averaging circuit into a rotation angle and displays the rotation angle. When there is axial back-lash or eccentricity, the count values of the two counters include amounts of phase shift equal to each other in opposite directions, but by adding and averaging these count values by the averaging circuit, the influence of the eccentricity is eliminated and a right rotation angle can be measured.

Heretofore, a reference pattern has been formed only at an arbitrary location on the rotatable disk of a rotation angle measuring apparatus of this kind, and a corresponding reference pattern has been formed at a predetermined position on the index disk. The two counters are reset by the use of reference signals obtained from the photoelectric conversion elements when the reference pattern of the rotatable disk and the reference pattern of the index disk become opposed to each other, but when there is radial back-lash in the rotary shaft, the radial grating formed on the rotatable disk rotates eccentrically and thus, the reference signal includes an error. Further, the error is increased by the hysteresis or the like in the signal processing circuits, and when the amount of the error exceeds a prescribed value, the resetting of the counters may deviate by an amount corresponding to one pitch of the pattern, and this has caused the occurrence of a measurement error.

SUMMARY OF THE INVENTION

It is a primary object of the present invention to provide a rotation angle measuring apparatus in which the occurrence of any measurement error can be prevented.

It is another object of the present invention to provide a rotation angle measuring apparatus in which first and second detecting members are provided in opposed relationship with a rotatable disk formed with an angular pattern for rotation angle detection, said first and second detecting members each have a detection pattern for detecting said angular pattern and are provided at substantially rotation-symmetrical positions on said rotatable disk, and the rotation angle of said rotatable disk is determined on the basis of the positional relation between the detection pattern of said first detecting member and the angular pattern of said rotatable disk and the positional relation between the detection pattern of said second detecting member and the angular pattern of said rotatable disk and wherein no measurement error will occur even if there is radial back-lash in a rotary shaft.

The apparatus of the present invention includes first and second reference patterns provided on said first and second detecting members, respectively, a third reference pattern provided at a first position on said rotatable disk, and a fourth reference pattern provided at a second position substantially rotation-symmetrical with the first position on said rotatable disk. Said third reference pattern is a pattern which can be detected by said first reference pattern and cannot be detected by said second reference pattern, and said fourth reference pattern is a pattern which can be detected by said second reference pattern and cannot be detected by said first reference pattern According to the rotation angle measuring apparatus of the present invention, a signal obtained by the third reference pattern of the rotatable disk being detected by the first reference pattern formed on the first detecting member is supplied as a first reference signal to a first signal processing circuit, and a signal obtained by the fourth reference pattern of the rotatable disk being detected by the second reference pattern formed on the second detecting member is supplied as a second reference signal to a second signal processing circuit. Accordingly, the first and second signal processing circuits can be operated independently of each other, and no measurement error will occur even if the pattern for rotation angle detection on the rotatable disk is eccentrically rotated.

In a preferred embodiment of the present invention, the first and third reference patterns are comprised of grating patterns of the same random pitch arrangement, and the second and fourth reference patterns are also comprised of grating patterns of another same random pitch arrangement. Therefore, when the first and third reference patterns become opposed to each other, the first reference signal is produced, and when the second and fourth reference patterns become opposed to each other, the second reference signal is produced.

DETAILED DESCRIPTION OF THE PREFERRED EMBODIMENTS

Figure 1:
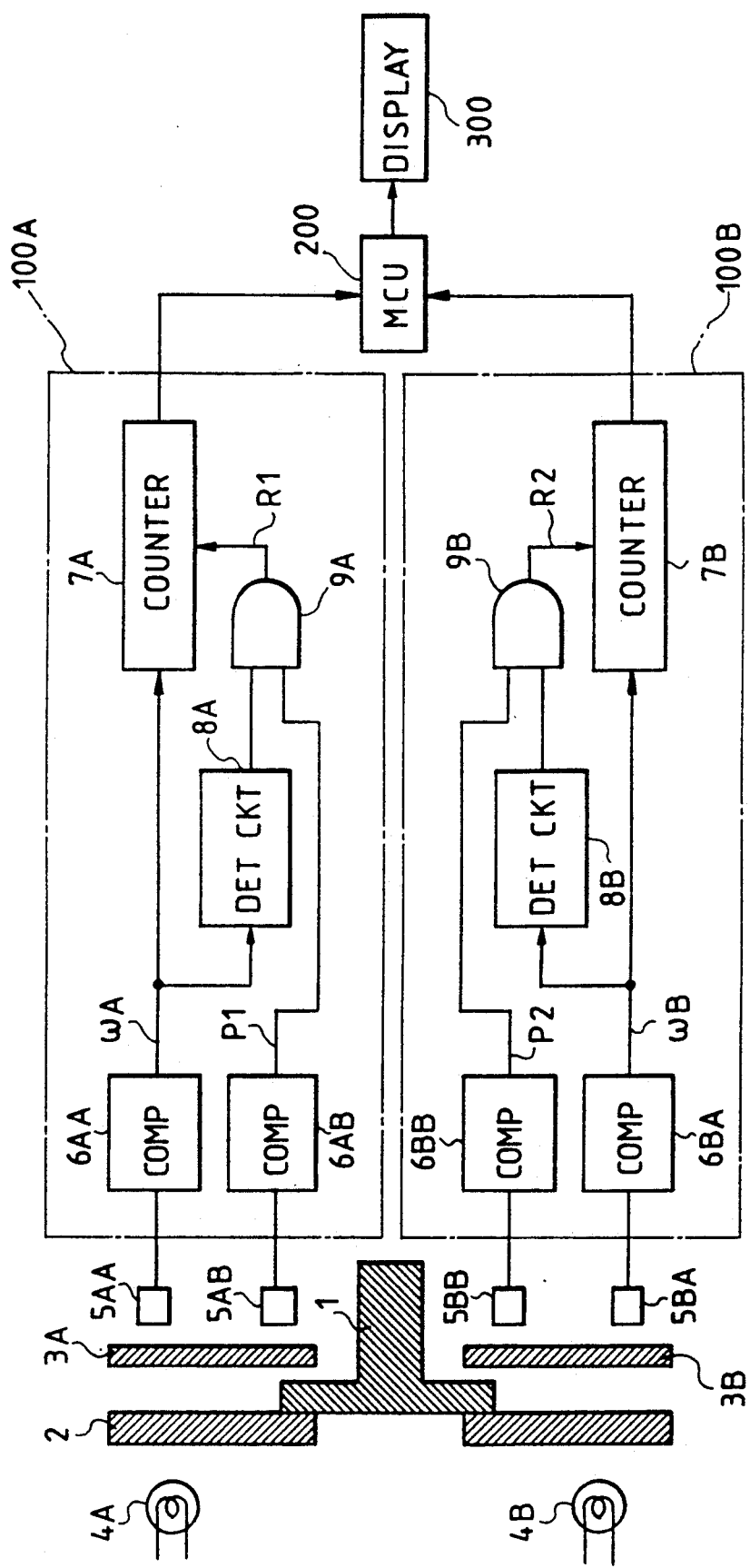
FIG. 1 shows the construction of a first embodiment of the rotation angle measuring apparatus of the present invention.
Figure 2:
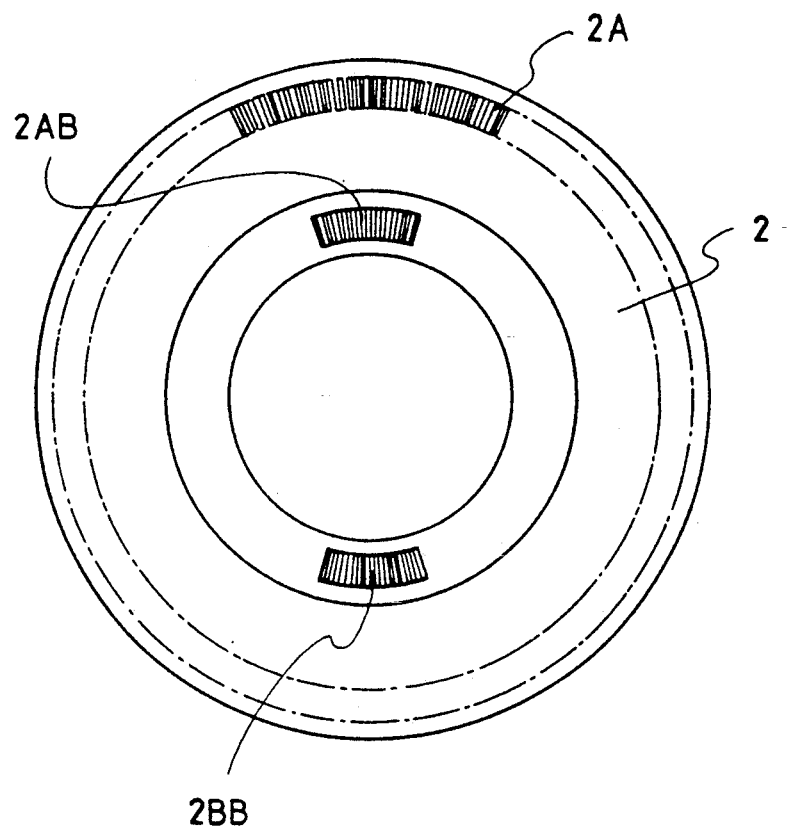
FIG. 2 is a plan view of the rotatable disk 2 of FIG. 1.

FIG. 1 shows the construction of an embodiment of the rotation angle measuring apparatus of the present invention. A rotatable disk 2 formed with a pattern for rotating angle detection, i.e., a radial grating 2A of equiangular pitch, on the circumference thereof as shown in FIG. 2 is fixed to a rotary shaft 1 concentrically therewith. A first detecting member 3A and a second detecting member 3B are fixed at two rotation-symmetrical positions on the rotatable disk 2 so as to be opposed to the rotatable disk 2.

Figure 3:
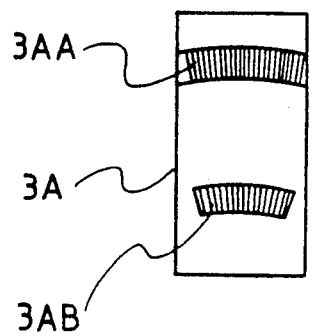
FIG. 3 is a plan view of the first detecting member 3A of FIG. 1.
Figure 4:
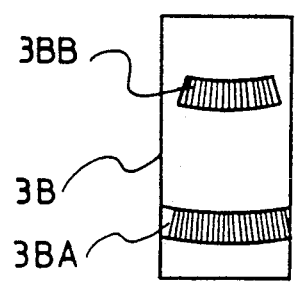
FIG. 4 is a plan view of the second detecting member 3B of the FIG. 1.

As shown in FIG. 3, the first detecting member 3A is formed with an angle measuring pattern of the same pitch as the radial grating formed on the rotatable disk 2, i.e., an index grating 3AA. Also, as shown in FIG. 4, the second detecting member 3B is formed with an angle measuring pattern of the same pitch as the radial grating formed on the rotatable disk 2, i.e., an index grating 3BA. The index gratings 3AA and 3BA are formed at opposite phases. Also, the first detecting member 3A is formed with a first reference pattern 3AB, and the second detecting member 3B is formed with a second reference pattern 3BB.

As shown in FIG. 2, a third reference pattern 2AB which can be detected by the first reference pattern 3AB of the first detecting member 3A and cannot be detected by the second reference pattern 3BB of the second detecting member 3B is formed at a first position on the rotatable disk 2. Also, a fourth reference pattern 2BB which can be detected by the second reference pattern 3BB of the second detecting member 3B and cannot be detected by the first reference pattern 3AB of the first detecting member 3A is formed at a second position rotation-symmetrical with the first position on the rotatable disk 2.

Figure 5:
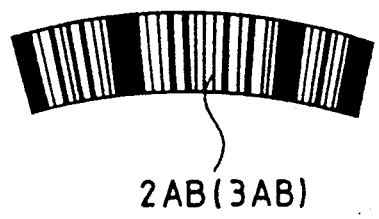
FIG. 5 shows an example of first and third reference patterns 2AB and 3AB formed on the first detecting member 3A and the rotatable disk 2, respectively.
Figure 6:
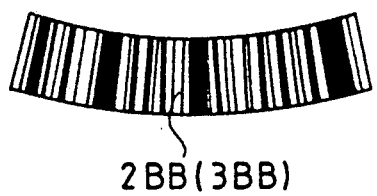
FIG. 6 shows an example of second and fourth reference patterns 2BB and 3BB formed on the second detecting member 3B and the rotatable disk 2, respectively.

In this embodiment, the first reference pattern 3AB of the first detecting member 3A and the third reference pattern 2AB of the rotatable disk 2 are both formed by a grating of the same random pitch arrangement as shown in FIG. 5, and the second reference pattern 3BB of the second detecting member 3B and the fourth reference pattern 2BB of the rotatable disk 2 are both formed by gratings of the same random pitch arrangements as shown in FIG. 6. The random grating of FIG. 5 and the random grating of FIG. 6 are entirely different patterns.

Turning back to FIG. 1, a light source 4A is disposed on the rotatable disk 2 side and two photoelectric conversion elements 5AA and 5AB are disposed on the first detecting member 3A side, with the rotatable disk 2 and the first detecting member 3A interposed therebetween. The photoelectric conversion element 5AA is fixed at a location opposed to the index grating 3AA, and the photoelectric conversion element 5AB is fixed at a location opposed to the random grating 3AB.

Also, a light source 4B is disposed on the rotatable disk 2 side and two photoelectric conversion elements 5BA and 5BB are disposed on the second detecting member 3B side, with the rotatable disk 2 and the second detecting member 3B interposed therebetween. The photoelectric conversion element 5BA is fixed at a location opposed to the index grating 3BA, and the photoelectric conversion element 5BB is fixed at a location opposed to the random grating 3BB.

As described above, the random grating 3AB of the first detecting member 3A and the random grating 2AB of the rotatable disk 2 are formed by the same patterns, and the random grating 3BB of the second detecting member 3B and the random grating 2BB of the rotatable disk 2 are formed by the same patterns and therefore, the first and third reference patterns 3AB and 2AB and the second and fourth reference patterns 3BB and 2BB are entirely different patterns. Therefore, when the first reference pattern 3AB and the third reference pattern 2AB become opposed to each other, the photoelectric conversion element 5AB outputs a reference signal, but when the first reference pattern 3AB and the fourth reference pattern 2BB become opposed to each other, the photoelectric conversion element 5AB does not output a reference signal.

Likewise, when the second reference pattern 3BB and the fourth reference pattern 2BB become opposed to each other, the photoelectric conversion element 5BB outputs a reference signal, but when the second reference pattern 3BB and the third reference pattern 2AB become opposed to each other, the photoelectric conversion element 5BB does not output a reference signal.

The output signals of the photoelectric conversion elements 5AA and 5AB are supplied to a signal processing circuit 100A, and the output signals (reference signals) of the photoelectric conversion elements 5BA and 5BB are supplied to a signal processing circuit 100B.

The signal processing circuit 100A is provided with comparators 6AA, 6AB, a counter 7A, a detection circuit 8A and an AND gate 9A. The comparator 6AA produces a high level signal when the output signal of the photoelectric conversion element 5AA is equal to or greater than zero, and outputs this signal as an angle measurement signal $\omega A$. The comparator 6AB produces a high level signal when the output signal of the photoelectric conversion element 5AB is equal to or greater than a predetermined value, and outputs this signal as a first reference pattern signal P1. The counter 7A counts the angle measurement signal $\omega A$. The detection circuit 8A produces an output synchronous with the change of the angle measurement signal $\omega A$ from a low level to a high level. The AND gate 9A receives the synchronous output of the detection circuit 8A by one input thereof and receives the first reference pattern signal P1 by the other input thereof, and produces a high level signal when said two signals are at a high level, and outputs this signal as a reset signal R1 to the counter 7A.

On the other hand, the signal processing circuit 100B is provided with comparators 6BA, 6BB, a counter 7B, a detection circuit 8B and an AND gate 9B. The comparator 6BA produces a high level signal when the output signal of the photoelectric conversion element 5BA is equal to or greater than zero, and outputs this signal as an angle measurement signal $\omega B$. The comparator 6BB produces a high level signal when the output signal of the photoelectric conversion element 5BB is equal to or greater than a predetermined value, and outputs this signal as a second reference pattern signal P2. The counter 7B counts the angle measurement signal $\omega B$. The detection circuit 8B produces an output synchronous with the change of the angle measurement signal $\omega B$ from a low level to a high level. The AND gate 9B receives the synchronous output of the detection circuit 8B by one input thereof and receives the second reference pattern signal P2 by the other input thereof, and produces a high level signal when said two signals are at a high level, and outputs this signal as a reset signal R2 to the counter 7B.

A microcomputer unit 200 receives the outputs of the signal processing circuits 100A and 100B, i.e., the count values of the counters 7A and 7B, finds the mean value of the two count values, converts it into a digital value of the rotation angle and outputs the digital value to a display device 300. The display device 300 displays the rotation angle output by the microcomputer unit 200. When there is axial back-lash or eccentricity, the count values of the two counters 7A and 7B include amounts of phase shift equal to each other in opposite directions, but by these count values being addition-averaged by the microcomputer unit 200, the influence of eccentricity is eliminated and a correct rotation angle can be measured.

Figure 7:
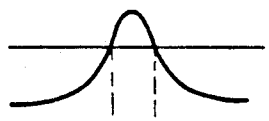
FIGS. 7(a–f) shows the signal waveforms of various portions of the embodiment of FIG. 1.
Figure 7:
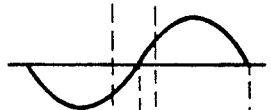
Figure 7:
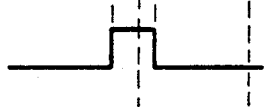
Figure 7:
Figure 7:
Figure 7:
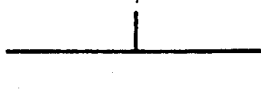

FIGS. 7(a-f) show the signal waveforms of the photoelectric conversion elements 5AA, 5AB and various portions of the signal processing circuit 100A in the embodiment of FIG. 1. The operation of the embodiment of FIG. 1 will hereinafter be described with reference to FIGS. 7(a-f). A sine wave signal output from the photoelectric conversion element 5AA in response to the rotation of the rotatable disk 2 is converted into an angle measurement signal ωA of rectangular wave shape by the comparator 6AA, and the angle measurement signal ωA is counted by the counter 7A. When the random grating 2AB of the rotatable disk 2 becomes opposed to the random grating 3AB of the first detecting member 3A, the output signal of the photoelectric conversion element 5AB assumes a predetermined value or greater, and a first reference pattern signal P1 of rectangular wave shape is output from the comparator 6AB.

On the other hand, the rising of the angle measurement signal of rectangular wave shape output from the comparator 6AA is detected by the detection circuit 8A, the logical product of the synchronous output of the circuit 8A and the signal P1 from the comparator 6AB is found by the AND gate 9A, and the counter 7A is reset by the high level signal of the AND gate 9A.

The operations of the photoelectric conversion elements 5BA, 5BB and the signal processing circuit 100B are the same as the operations of the photoelectric conversion elements 5AA, 5AB and the signal processing circuit 100A with the exception that the former are opposite in phase to the latter, and the counter 7B is reset by the high level signal of the AND gate 9B.

The counters 7A and 7B, after reset, count the angle measurement signals ωA and ωB, respectively, and the microcomputer unit 200 averages the count values of the two counters 7A and 7B and further converts the average value into a digital rotation angle, which is then displayed by the display device 300.

As described above, the counters 7A and 7B can be reset independently of each other on the basis of corresponding reference patterns (random gratings) and therefore, even if the reference patterns are eccentrically rotated, there will occur no measurement error. Also, the positions of the detecting members 3A and 3B can be adjusted independently of each other, and the adjustment becomes easy.

In the above-described embodiment, reference patterns are formed at the two rotation-symmetrical positions on the rotatable disk and reference patterns are formed on the two corresponding detecting members, but alternatively, the following construction may be adopted.

N (N being 3 or greater positive integer) different reference patterns are formed at equally divided positions on the circumference of the rotatable disk on which the pattern for rotation angle detection (radial grating) is formed, and N detecting members each having a pattern for angle measurement corresponding to the pattern for rotation angle detection are disposed. On the N detecting members, there are provided reference patterns corresponding to the reference patterns of the rotatable disk. Accordingly, respective ones of the N reference patterns of the rotatable disk are detected by the corresponding detecting members, but are not detected by the other detecting members. Provision is further made of N signal processing circuits for finding an angle signal indicative of the rotation angle of the rotatable disk on the basis of N signals output in conformity with the positional relation between the patterns for angle measurement on the N detecting members and the pattern for rotation angle detection on the rotatable disk, and an averaging circuit for finding the average value of the rotation angles indicated by the angle signals output from the N signal processing circuits. The corresponding reference patterns on the rotatable disk are detected by the N detecting members, and N signals thus obtained are supplied as reference signals to the corresponding ones of the N signal processing circuits. As a result, the cumulative error of measurement can be eliminated.

What is claimed is:

1. A rotation angle measuring apparatus comprising:
   a rotatable disk formed with an angle pattern for rotation angle detection;
   a first detecting member having a detection pattern for detecting said angle pattern;
   a second detecting member having a detection pattern for detecting said angle pattern and provided at substantially rotation-symmetrical position of said rotatable disk with respect to said first detecting member;
   means for determining the rotation angle of said rotatable disk on the basis of the positional relation between the detection pattern of said first detecting member and the angle pattern of said rotatable disk and the positional relation between the detection pattern of said second detecting member and the angle pattern of said rotatable disk; and
   means for producing a reference signal defining the rotation reference of said rotatable disk, said reference signal producing means including a first reference pattern provided on said first detecting member, a second reference pattern provided on said second detecting member, a third reference pattern which is provided at a first position on said rotatable disk and which can be detected by said first reference pattern and cannot be detected by said second reference pattern, and a fourth reference pattern which is provided at a second position substantially rotation-symmetrical with the first position on said rotatable disk and which can be detected by said second reference pattern and cannot be detected by said first reference pattern.

2. An apparatus according to claim 1, wherein said determining means includes:
   first signal processing means for producing a first angle signal indicative of the rotation angle of said rotatable disk on the basis of the positional relation between the detection pattern of said first detecting member and the angle pattern of said rotatable disk; and second signal processing means for producing a second angle signal indicative of the rotation angle of said rotatable disk on the basis of the positional relation between the detection pattern of said second detecting member and the angle pattern of said rotatable disk.

3. An apparatus according to claim 2, wherein said determining means further includes an averaging circuit for finding the average value of the rotation angles indicated by said first and second angle signals.

4. An apparatus according to claim 3, wherein said reference signal producing means includes:
   means for supplying a signal obtained by said third reference pattern of said rotatable disk being detected by said first reference pattern as a first reference signal to said first signal processing means; and
   means for supplying a signal obtained by said fourth reference pattern of said rotatable disk being detected by said second reference pattern as a second reference signal to said second signal processing means.

5. An apparatus according to claim 1, wherein said first and third reference patterns are random grating patterns having the same random pitch arrangements, and said second and fourth reference patterns are random grating patterns having the same random pitch arrangements differing from said first-mentioned random gratings.

6. A rotation angle measuring apparatus comprising:
   a rotatable disk formed with an angle pattern for rotation angle detection;
   a plurality of detecting members provided at positions equally dividing said rotatable disk circumferentially thereof and having detection patterns for detecting said angle pattern;
   means for determining the rotation angle of said rotatable disk on the basis of the positional relations between the detection patterns of said plurality of detecting members and the angle pattern of said rotatable disk; and
   means for producing a reference signal defining the rotation reference of said rotatable disk, said reference signal producing means including a plurality of different reference patterns provided on said plurality of detecting members, and a plurality of reference patterns which are provided at the circumferentially equally divided positions of said rotatable disk correspondingly to respective ones of said plurality of detecting members and which can be detected by the reference patterns of the corresponding detecting members and cannot be detected by the reference patterns of the other detecting members.

7. An apparatus according to claim 6, wherein said determining means includes means for producing a plurality of output signals corresponding to changes in the relative positions between the detection patterns of said plurality of detecting means and the angle pattern of said rotatable disk, and a plurality of signal processing circuits for outputting an angle signal indicative of the angle of rotation of said rotatable disk on the basis of said plurality of output signals.

8. An apparatus according to claim 7, wherein said reference signal producing means includes means for supplying a plurality of signals obtained by the corresponding reference patterns of said rotatable disk being detected by the reference patterns of said plurality of detecting means as reference signals to the corresponding ones of said plurality of signal processing circuits.

9. An apparatus according to claim 7, wherein said determining means further includes averaging means for finding the average value of rotation angles represented by a plurality of angle signals from said plurality of signal processing circuits.

* * * * *